(12) United States Patent
Asjad

(10) Patent No.: US 7,775,546 B2
(45) Date of Patent: Aug. 17, 2010

(54) COLLAPSING VEHICLE TOW HOOK

(75) Inventor: Moin U. Asjad, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 326 days.

(21) Appl. No.: 11/923,719

(22) Filed: Oct. 25, 2007

(65) Prior Publication Data

US 2009/0108566 A1 Apr. 30, 2009

(51) Int. Cl.
*B60D 1/48* (2006.01)
*E01F 9/018* (2006.01)

(52) U.S. Cl. .......................................... 280/498; 403/2

(58) Field of Classification Search .............. 280/415.1, 280/491.1, 494, 498; 293/130, 132; 403/2
See application file for complete search history.

(56) References Cited

U.S. PATENT DOCUMENTS

| | | | | |
|---|---|---|---|---|
| 2,153,309 A | * | 4/1939 | Milz et al. | 280/492 |
| 5,054,806 A | * | 10/1991 | Chester | 280/495 |
| 5,454,453 A | * | 10/1995 | Meyer et al. | 180/377 |
| 5,673,953 A | * | 10/1997 | Spease | 293/118 |
| 6,142,542 A | * | 11/2000 | Sherno | 293/132 |
| 6,394,512 B1 | * | 5/2002 | Schuster et al. | 293/15 |
| 6,802,522 B1 | * | 10/2004 | Park et al. | 280/495 |
| 6,896,281 B2 | * | 5/2005 | Lenzen et al. | 280/495 |
| 7,207,590 B2 | * | 4/2007 | Haneda et al. | 280/495 |
| 7,216,904 B2 | * | 5/2007 | Thomas | 293/102 |
| 2001/0016144 A1 | * | 8/2001 | Dent | 403/2 |

* cited by examiner

*Primary Examiner*—Lesley Morris
*Assistant Examiner*—Daniel Yeagley

(57) ABSTRACT

A collapsible tow hook for a motor vehicle includes a housing attached to a vehicle structure, a bracket pivotally mounted on the housing, a tow loop attached to the bracket and adapted to receive a tow cable that pulls on the tow loop in a towing direction. An interlocking structure acts between the bracket and the housing to normally support the bracket against pivotal movement but is yieldable to permit pivotal movement of the bracket relative the housing upon the imposition of a load on the tow loop in a direction opposite to the towing direction so that the tow loop is pivoted to a collapsed position relative to the vehicle structure.

4 Claims, 4 Drawing Sheets

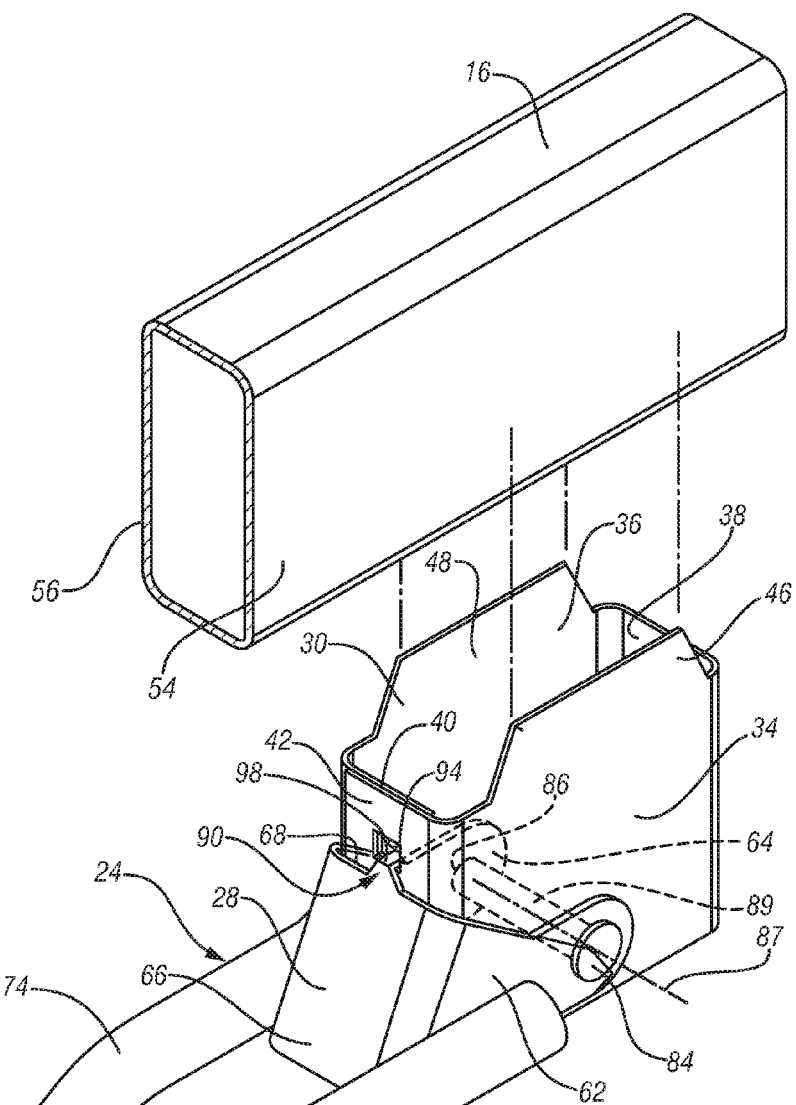
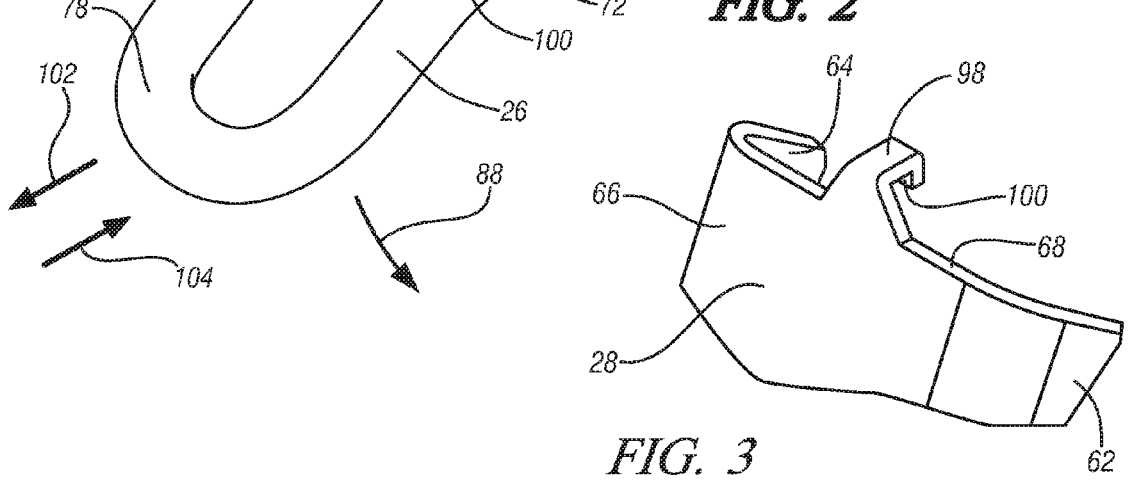
FIG. 2
FIG. 3

COLLAPSING VEHICLE TOW HOOK

FIELD OF THE INVENTION

The present invention relates to a tow hook mounted on a vehicle and more particularly a tow hook having high strength under loads imposed in one direction during towing but being yieldable and collapsible under loads imposed in the direction opposite to the towing direction.

BACKGROUND OF THE INVENTION

Many motor vehicles, particularly trucks, have one or more tow hooks attached to the bumper or to the frame rail, or other vehicle structure. The tow hooks permit a wrecker, a tow truck, or a tow tractor to be readily connected to the vehicle via a chain or a cable. A typical tow hook is a heavy duty ring or loop of metal, and the ring or loop is attached to the vehicle structure. The tow hook may be mounted on the front of the vehicle or on the rear of the vehicle.

Modern vehicles must comply with governmental regulations that define the crush performance of the vehicle under impact against a barrier. In some cases, the presence of the tow hook may alter the crush performance of the vehicle, and accordingly the vehicle structure surrounding the tow hook must be designed to offset the affect of the tow hook.

It would be desirable to provide a new and improved tow hook for vehicles that would be of high strength and reliability for towing and yet have little influence on the compliance with governmental regulations pertaining to vehicle barrier performance.

SUMMARY OF THE INVENTION

A collapsible tow hook for a motor vehicle includes a housing attached to a vehicle structure, a bracket pivotally mounted on the housing, a tow loop attached to the bracket and adapted to receive a tow cable that pulls on the tow loop in a towing direction. An interlocking structure acts between the bracket and the housing to normally support the bracket against pivotal movement but is yieldable to permit pivotal movement of the bracket relative the housing upon the imposition of a load on the tow loop in a direction opposite to the towing direction so that the tow loop is pivoted to a collapsed position relative to the vehicle structure.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is an exploded perspective view of one of the tow hooks of FIG. 1;

FIG. 3 is an enlargement of a fragment of FIG. 2;

DETAILED DESCRIPTION OF THE EXEMPLARY EMBODIMENTS

The following description of certain exemplary embodiments is merely exemplary in nature and is not intended to limit the invention, its application, or uses.

Figure 1:
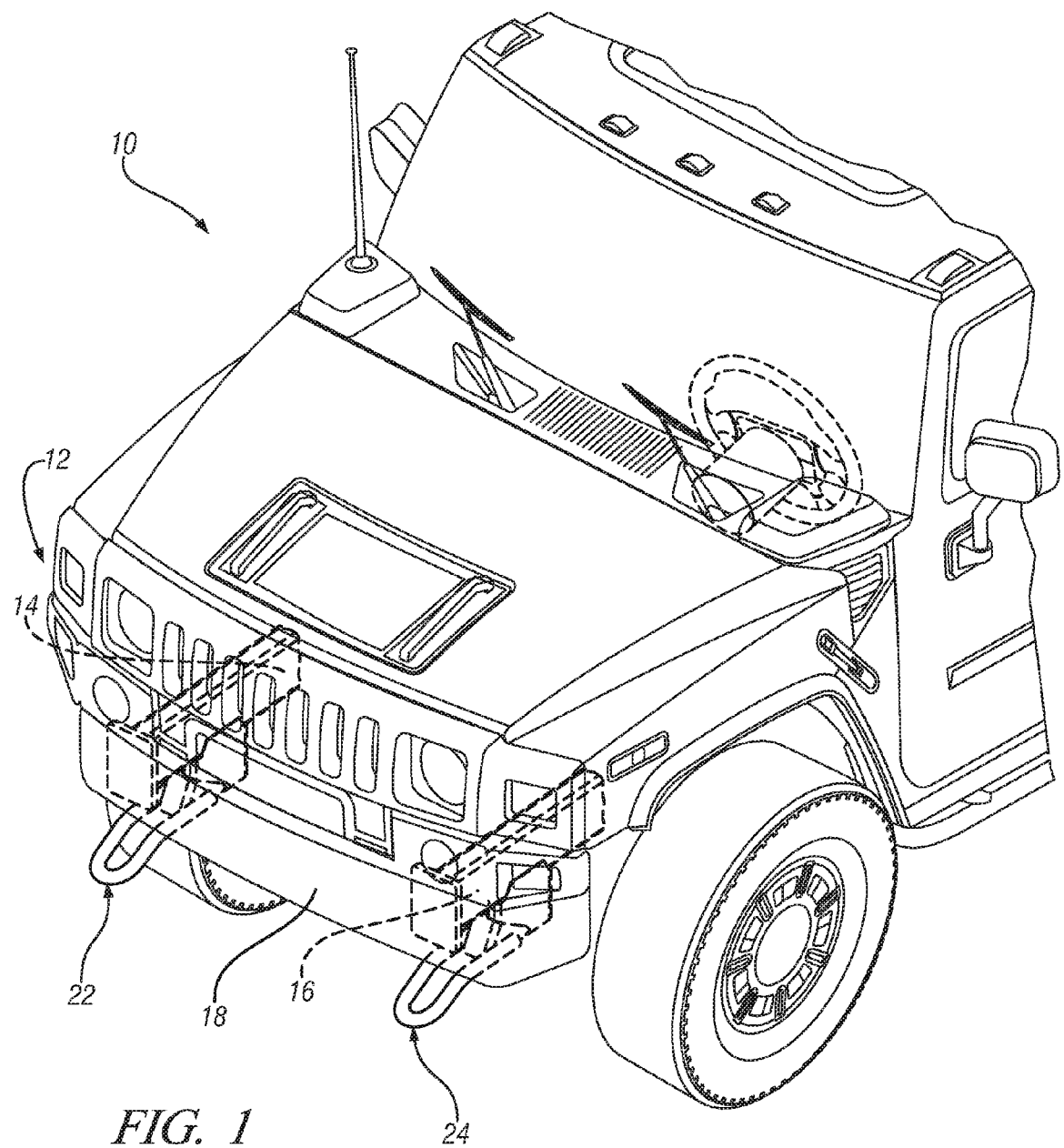
FIG. 1 is a perspective view of a motor vehicle having a pair of tow hooks mounted on the vehicle structure at the front of the vehicle.

Referring to FIG. 1, a motor vehicle 10 has a front end structure 12 including a left frame rail 14, a right frame rail 16, and a front bumper 18 that is attached to the front ends of the left frame rail 14 and right frame rail 16. A left tow hook assembly 22 is attached to the left frame rail 14 and a right tow hook assembly 24 is attached to the right frame rail 16.

Referring to FIG. 2, it is seen that the right tow hook assembly 24 includes a loop 26, a U-shaped hinge bracket 28, and a housing 30.

The housing 30 is stamped of heavy gauge sheet material and includes spaced apart right side wall 34 and left side wall 36 that are connected by an integral back wall 38 and overlapped front walls 40 and 42. The right side wall 34 has a mounting tab 46 and the left side wall 36 has a mounting tab 48 that extend upwardly to lie upon side walls 54 and 56 of the right frame rail 16 and be welded thereto.

The hinge bracket 28 is of a U-shape and is stamped of heavy gauge sheet material. The hinge bracket 28 includes a right leg 62 and a left leg 64 that are connected by a front wall 66. The front wall 66 has a top edge 68.

The loop 26 is a U-shaped piece of bar stock that straddles the hinge bracket 28, and has a right leg 72 welded to the right side wall 34 of the hinge bracket 28 and a left leg 74 welded to the left side wall 36 of the hinge bracket 28. The loop 26 has a forwardmost end portion or bight 78 that extends between the legs 72 and 74 and is adapted to receive a cable or a chain of a towing vehicle.

The hinge bracket 28 is attached to the housing 30 by a pivot 84 acting between the right leg 62 of the hinge bracket 28 and the right side wall 34 of the housing 30, and by a pivot 86 acting between the left hand leg 64 of the bracket 28 and the left side wall 36 of the housing 30. The pivots 84 and 86 can be provided by either a pivot shaft 89 that extends across the housing 30 from side to side as shown in FIG. 2, or by individual rivets or bolts and nuts provided at each side of the housing 30. The pivots 84 and 86 permit the bracket 28 and the loop 26 to pivot downwardly in the direction of arrow 88, as will be discussed hereinafter.

The bracket 28 is normally held in the position of FIGS. 1 and 2 against downward rotation in the direction of arrow 88 by interlocking structure, generally indicated at 90, and including a slot 94 provided in the overlapped walls 40 and 42 of the housing 30 and a projecting tab 98 that is stamped integral with the front wall 66 of the bracket 28. The projecting tab 98 reaches into the slot 94, and has a leg 100, best seen in FIG. 3, that seats behind the overlapped walls 40 and 42 of the housing 30 to anchor the bracket 28 against movement relative to the housing 30 until a force is applied to the loop 26 and the bracket 28 of sufficient force to deform the interlocking structure 90. The deformation of the interlocking structure may occur either through the bending or tearing of the projecting tab 98, or by the bending or tearing of the overlapping walls 40 and 42.

The vehicle 10 can be towed by connecting a cable or a chain to the loop 26 and using a tow truck or tractor to pull the loop 26 in the towing direction of arrow 102. During such towing, the load will be carried at the pivots 84 and 86 and the top edge 68 of the front wall 66 will be engaged with the front wall 42 of the housing 30 so that little or no load will be imposed upon the interlocking structure 90. However, in the event that the vehicle 10 impacts a barrier, a load is imposed on the loop 26 in the direction of arrow 104, thereby imposing a rotational force on the loop 26 in the direction of arrow 88, tending to deform the interlocking structure 90 provided by the projecting tab 98 and the slot 94.

As best seen in FIG. 2, the loop 26 is bent somewhat at 100 and angles downwardly so that the forwardmost end 78 is at an elevation that is lower than the pivots 84 and 86. Thus the top surface of the tow hook loop 26 constitutes an inclined plane with respect to the horizontal plane of the highway surface. Accordingly, the impact of the loop 26 with a barrier will induce the downward rotation of the loop 26 in the direction of arrow 88 and the interlocking structure 90 comprised of the projecting tab 98 and the slot 94 will be placed in tension. If the impact force exceeds a certain threshold, the tab 98 will bend or tear, or the slot 94 will bend or tear, or both the tab 98 and slot 94 will bend or tear, to release the loop 26 and the bracket 28 for collapsing movement in the direction of arrow 88. Furthermore, the bending and/or tearing of the tab 98 and slot 94 will function to absorb energy.

Thus, it is seen that the tow hook can collapse downwardly out of the way so that the full impact force can be taken by the vehicle bumper and other vehicle structures which are designed to crush in controlled manner upon barrier impact. In addition, the bending or tearing of the tab 98 will function to absorb energy.

Figure 4:
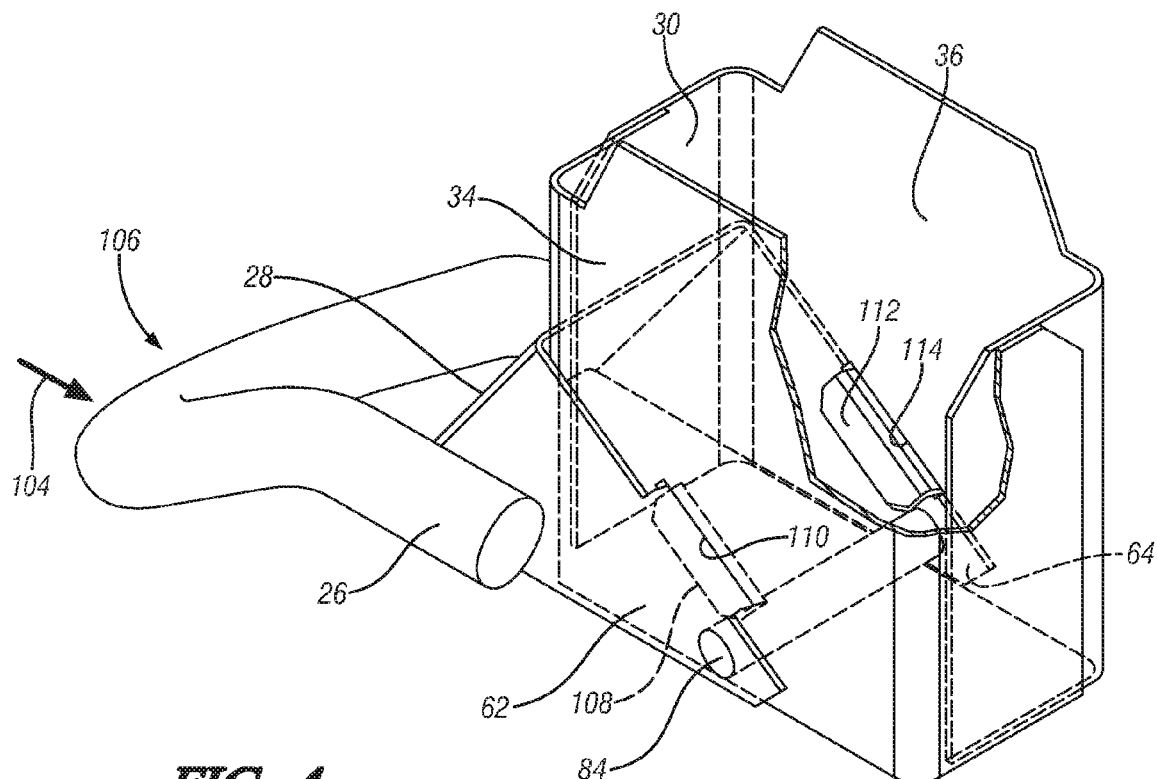
FIG. 4 is a perspective view, having parts broken away and in section, of another embodiment of the invention.

Referring to FIG. 4, another embodiment of the invention is shown. In FIG. 4, the right leg 62 of the bracket 28 is attached to the right side wall 34 of housing 30 by pivot 84. The right leg 62 has an integrally formed tab 108 that extends through a slot 110 provided in the right side wall 34 to establish the bracket 28 and loop 26 at the normal towing position. When a barrier impact is imposed on the loop 26, the tab 108 is loaded and will yield by bending or tearing, or cause a bending or tearing of the left side wall 36 so that energy is absorbed and the loop 26 will collapse downwardly. A similar interlocking structure in the form of a tab 112 and slot 114 can be provided between the left side wall 36 and left leg 64.

Figure 5:
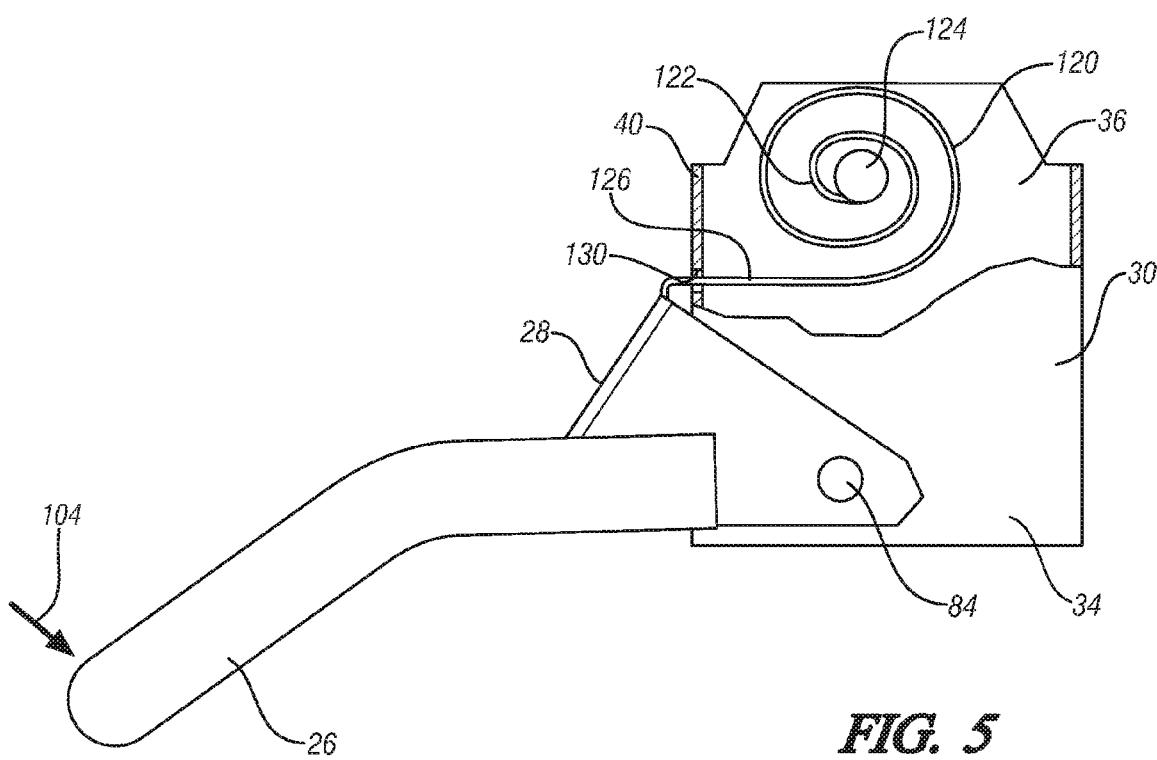
FIG. 5 is a side elevation view, having parts broken away and in section, showing another embodiment of the invention.

Referring to FIG. 5, another embodiment of the invention is shown. In FIG. 5, additional energy absorption is provided by a coiled strip 120 of metal that has an inner end 122 fixedly mounted on a mounting shaft 124 that is fixed between the side walls 34 and 36 of the housing 30. An outer end 126 of the coiled strip 120 reaches through a slot 130 in the front wall 40 of the housing 30 and is fixed to the hinge bracket 28 either directly to the hinge bracket 28 as shown in FIG. 5, or by attachment to a tab 98 similar to that of FIGS. 1-3. Upon imposition of load on the loop 26 in the direction of arrow 104, the coiled strip 120 will be drawn tight upon itself as the outer end 126 is pulled through the slot 130. If desired, the coiled strip 120 can be of greater width than the width of the slot 130 so that the coiled strip 120 will be deformed and extruded through slot 130.

Figure 6:
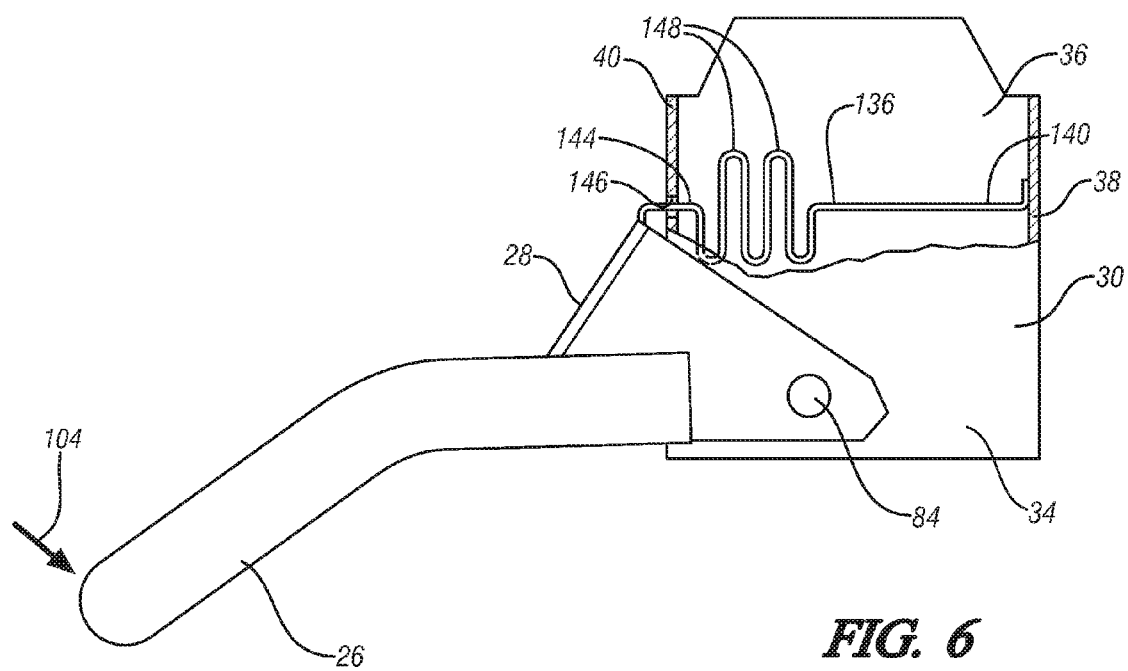
FIG. 6 is a view similar to FIG. 5 but showing yet another embodiment of the invention.

In FIG. 6, a convoluted strip 136 of metal has an inner end 140 fixedly mounted on back wall 38 and an outer end 144 that reaches through a slot 146 in the front wall 40 of the housing 30 and is fixed to the hinge bracket 28 either directly to the hinge bracket 28 or by attachment to a tab 98 similar to that of FIG. 1-3. Upon imposition of load on the loop 26 in the direction of arrow 104, the convoluted strip 136 of FIG. 6 will be tensioned and convolutions 148 will be straightened as the convoluted strip 136 is pulled through the slot 146. If desired, the convoluted strip 136 can be of greater width than the width of the slot 146 so that the convoluted strip 136 will be deformed and extruded through slot 146, thus absorbing more energy.

Figure 7:
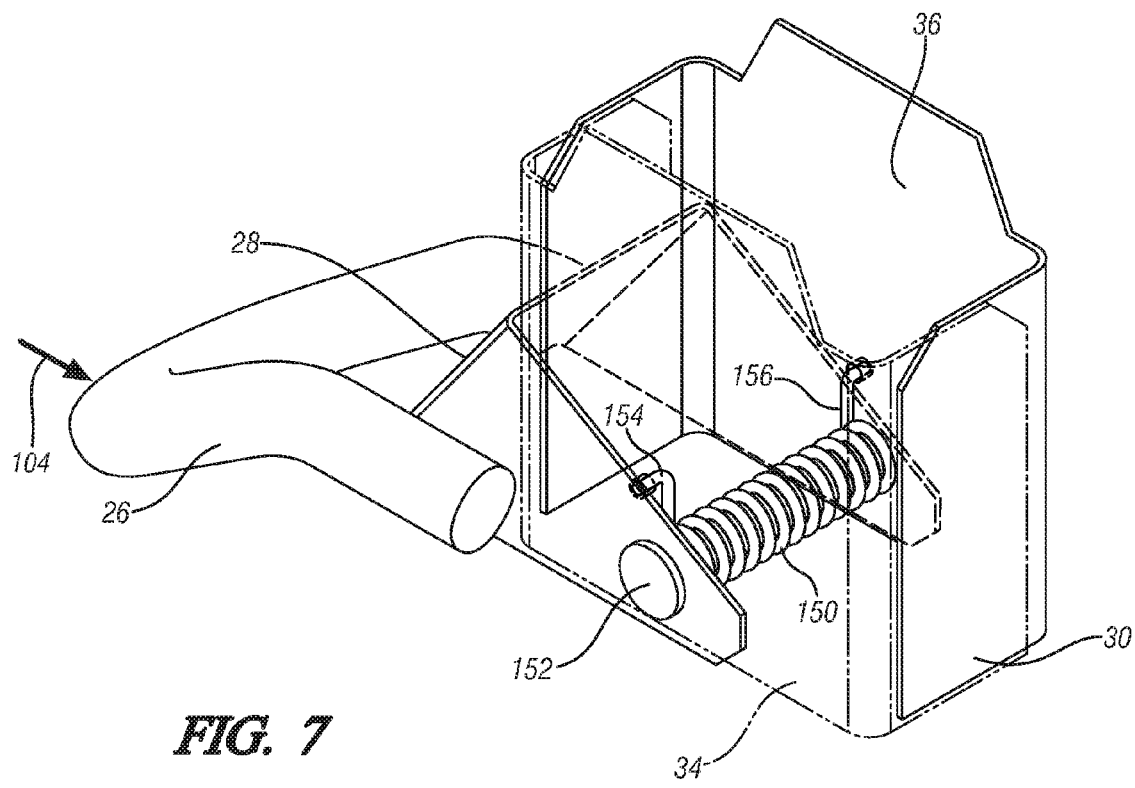
FIG. 7 is a perspective view, having parts broken away and in section, of yet another embodiment of the invention.

Referring to FIG. 7, it is seen that a heavy spring 150 encircles a pivot shaft 152 that mounts the hinge bracket 28 on the housing 30. One end 154 of the spring 150 is anchored on the side wall 34 of the housing 30 and the other end 156 of the spring is anchored on the bracket 28. This spring will normally establish the loop 26 at its normal towing position, but will yield when a load is imposed on the loop 26 in the direction of arrow 104 to absorb energy while allowing the loop 26 to collapse downwardly.

The foregoing description of the invention is merely exemplary in nature and, thus, variations thereof are intended to be within the scope of the invention. For example, the interlocking structure 90 is not limited to the particular tab and slot construction shown in the drawings, but rather, many equivalent structures will be apparent to a person of ordinary skill. For example, the tab 98 can be provided on the housing 30 and the slot 94 can be provided on the bracket 28. Or a frangible bolt may be provided between the bracket 28 and the housing 30, with the frangible bolt fracturing upon impact to release the bracket for collapsing movement. And although the example shown in the drawings is of a tow hook that will pivot and collapse downwardly toward the ground, the tow hook assembly may be constructed so that the tow hook and bracket will pivot upwardly away from the ground.

What is claimed is:

1. A collapsible tow hook for a motor vehicle comprising:
   a housing attached to a vehicle structure;
   a bracket of U-shape and having spaced apart legs straddling the housing and being pivotally mounted on the housing;
   a tow loop of U-shape having spaced apart legs attached to the bracket, said tow loop adapted to receive a tow cable that pulls on the tow loop in a towing direction;
   and an interlocking structure acting between the bracket and the housing to normally support the bracket against pivotal movement but being yieldable to permit pivotal movement of the bracket relative the housing upon the imposition of a load on the tow loop in a direction opposite to the towing direction so that the tow loop is pivoted to a collapsed position relative to the vehicle structure, said interlocking structure including a tab formed integrally on one of the bracket and housing that projects into a slot in the other of the bracket and housing to normally support the bracket against pivotal movement and at a normal position angled downwardly from the axis of the pivotal mounting of the bracket to the housing so that upon the imposition of force in the direction opposite to the towing direction the tow loop is induced to pivot downwardly, and said tab bending upon the imposition of load and thereby disengaging from the slot to absorb energy and allow the pivoting movement of the tow loop to the collapsed position.

2. A collapsible tow hook for a motor vehicle comprising:
   a housing having side walls attached to a vehicle structure and a front wall;
   a U-shaped hinge bracket having left and right legs pivotally mounted on the side walls of the housing and a front wall connecting the right and left legs;
   a tow loop formed of a U-shaped bar stock having left and right legs welded to the left and right legs of the hinge bracket and adapted to receive a tow cable that pulls on the tow loop in a towing direction, said legs of the tow hook having a forwardmost portion at an elevation lower than the pivotal attachment of the hinge bracket to the housing;

at least one interlocking tab formed integrally with the front wall of the hinge bracket and extending into at least one slot provided in the front wall of the housing; said tab engaging with the front wall of the housing to normally support the hinge bracket and tow loop against pivotal movement and said tab bending upon the imposition of a load on the tow loop and thereby disengaging from the slot to absorb energy and allow the downward pivoting movement of the tow loop to a collapsed position.

3. The collapsible tow hook for a motor vehicle of claim 2 further comprising said housing having a rear wall integral with the side walls, and said front wall of the housing being first and second overlapped walls and the slot being provided in the overlapped walls so that the tab is engages with the overlapped walls.

4. A collapsible tow hook for a motor vehicle comprising:

a housing having left and right side walls attached to a vehicle structure and a front wall;

a U-shaped hinge bracket having left and right legs respectively pivotally mounted on the side walls of the housing and a front wall connecting the right and left legs;

a tow loop formed of a U-shaped bar stock having left and right legs welded to the left and right legs of the hinge bracket and adapted to receive a tow cable that pulls on the tow loop in a towing direction, said legs of the tow hook having a forwardmost portion at an elevation lower than the pivotal attachment of the hinge bracket to the housing;

a tab formed integrally with the left leg of the hinge bracket and extending into a slot provided in the left wall of the housing and a tab formed integrally with the right leg of the hinge bracket and extending into a slot provided in the right wall of the housing, said tabs respectively engaging with the left and right side walls to normally support the bracket and tow loop against pivotal movement and said tabs bending upon the imposition of a load on the tow loop and thereby disengaging from the slots to absorb energy and allow the downward pivoting movement of the tow loop to a collapsed position.

* * * * *